United States Patent [19]

Shasha et al.

[11] 4,348,492

[45] Sep. 7, 1982

[54] STARCH ADDUCT ENCASEMENT OF PARTICULATE ELASTOMERS

[75] Inventors: Baruch S. Shasha; Thomas P. Abbott, both of Peoria, Ill.

[73] Assignee: The United States of America as represented by the Secretary of Agriculture, Washington, D.C.

[21] Appl. No.: 202,395

[22] Filed: Oct. 30, 1980

[51] Int. Cl.$^3$ .................. C08L 3/04; C08L 21/00
[52] U.S. Cl. ............................ 524/52; 523/201; 523/205; 523/207; 523/334; 524/47; 525/54.26
[58] Field of Search ............. 260/17.4 ST, 17.4 BB, 260/749, 3; 523/201, 205, 207, 332, 334; 524/47, 52, 734; 525/54.26

[56] References Cited

U.S. PATENT DOCUMENTS

| | | | |
|---|---|---|---|
| 3,673,136 | 6/1972 | Buchanan et al. | 260/17.4 BB |
| 3,714,087 | 1/1973 | Buchanan et al. | 260/17.2 |
| 3,830,762 | 8/1974 | Abbott | 260/17.4 ST |
| 3,915,909 | 10/1975 | Schnoring et al. | 260/17.4 BB |
| 3,941,767 | 3/1976 | Abbott | 260/17.4 BB |
| 4,194,999 | 3/1980 | Hayashi et al. | 260/17.4 BB |

OTHER PUBLICATIONS

W. J. Connick, Jr., "Encapsulation of Herbicides in Alginate Gels for Aquatic Weed Control" Proc. of 6th International Symposium on Controlled Release of Bioactive Materials, 6–8, Aug. 1979, New Orleans, La.
Allinger et al, *Organic Chemistry*, 1971, Worth Publishers, Inc., New York, N.Y. pp. 436–440, "Alkoxides and Phenoxides, Ether Formation".

*Primary Examiner*—John Kight, III
*Assistant Examiner*—Nathan Nutter
*Attorney, Agent, or Firm*—M. Howard Silverstein; David G. McConnell; Curtis P. Ribando

[57] ABSTRACT

Powdered and crumb rubber are prepared by dispersing in a starch alkoxide paste appropriately sized particles of wet curd from the precipitation of a latex emulsion, and then insolubilizing the paste by treatment with select bivalent cations. The result is a starch adduct encasing the particulate elastomer, thereby preventing agglomeration and congealing upon storage.

10 Claims, No Drawings

STARCH ADDUCT ENCASEMENT OF PARTICULATE ELASTOMERS

CROSS REFERENCE TO RELATED APPLICATIONS

This application is related to commonly assigned application Serial No. 202,396, filed concurrently herewith by Baruch S. Shasha entitled "Encapsulation by Entrapment Within Starch Adduct Matrix".

BACKGROUND OF THE INVENTION

1. Field of the Invention

Bulk elastomer stock used for the manufacture of rubber goods is conventionally prepared by coagulating a latex emulsion or emulsified latex masterbatch formulation with alum, acid, or other suitable agent. The resultant coagulum is washed free of the coagulation liquids and subsequently dried. Despite the fact that the wet curds may be in a particulate form, they will invariably congeal into a solidified mass upon drying. Consequently, an energy-intensive and time-consuming, high shear milling or mixing step is required for further formulation and processing.

The instant invention relates to a process for treating the wet coagulum so as to prevent congealing and to promote the production of free-flowing powdered elastomer compositions.

2. Description of the Prior Art

Previous attempts to produce powdered elastomer compositions have entailed coagulation of the latex or masterbatch formulation in the presence of a colloidally dispersed cereal grain polysaccharide such as pregelatinized starch, pregelatinized flour, aminated starches, and starch xanthate. In U.S. Pat. No. 3,673,136 and 3,714,087, Buchanan et al. teach that a free-flowing, fine powder can be produced if the polysaccharide elastomer coprecipitate is ground in a conventional comminuting machine after drying. Addition of powdered curatives prevent reagglomeration upon storage. Curatives and other additives can be mixed with the powdered coprecipitates in a simple powder blender which requires much less time and energy than the high shear milling or mixing equipment required by the conventional process. However, widespread commercialization of this technique has been inhibited by the expense and precise control required by the comminuting process, as well as by the mediocre properties of the vulcanized rubber products formed from the powdered compositions.

In U.S. Pat. No. 3,830,762, Abbott teaches that by repeatedly washing the polysaccharide-elastomer coprecipitate with a water-miscible solvent until the moisture content is between 0 and 10%, the necessity for comminution is eliminated. An improvement of this method is taught by Abbott in U.S. Pat. No. 3,941,767, wherein the precipitate is subjected to a second encasement prior to the washing step, thereby further reducing tackiness and enabling minimal incorporation of the polysaccharide material. While the best results were obtained with starch xanthate as the polysaccharide material, industrial acceptance of the process has been hindered by the toxicity and flammability of this agent. Moreover, the numerous processing steps required by the repeated encapsulations and solvent washings were found to be undesirable for a commercial procedure.

SUMMARY OF THE INVENTION

We have now discovered a simplified method for preparing free-flowing nonagglomerating, particulate elastomer compositions without the use of xanthates. We have surprisingly found that the particulate wet curds from the conventional coagulation of a latex emulsion can be protectively encased by dispersing them in a starch-containing material (SCM) alkoxide paste and then rapidly insolubilizing the SCM with a suitable bivalent cation selected from the group consisting of calcium, barium, and strontium.

In accordance with this discovery, it is an object of the invention to provide a facile, industrially acceptable method for the production of powdered elastomers and powdered elastomer masterbatch formulations.

It also is an object of the invention to prepare the abovementioned powdered elastomer materials by utilizing an encasing material which is inexpensive, nontoxic, and derived from natural, renewable resources.

It is a further object of the invention to prepare particulate elastomer compositions which will not congeal upon storage and which can be readily blended with conventional additives prior to molding, extrusion, or other methods of article manufacture.

Another object of the invention is to provide particulate elastomeric compositions which will yield cured products characterized by high strength and elasticity.

Other objects and advantages of this invention will become readily apparent from the ensuing description.

DETAILED DESCRIPTION OF THE INVENTION

The term "particulate" as used herein is intended to refer to powder-size particles of 2 mm. or less (70% passing a 10-mesh screen) as well as crumb size particles of greater than 2 mm. Functionally, the powder-size particles are understood in the art as being of sufficiently small dimension that they are readily blended with the normal rubber additives without segregation upon further handling.

The starch-containing materials (SCM) for use in accordance with the invention include the natural starches such as cereal, potato, and tapioca starch, and flours containing the same, as well as starch fractions (e.g., amylose and amylopectin), derivatized starches such as methyl starch and hydroxyethyl starch, and modified starches. As a practical matter, these starches will be in their original granular form, though pregelatinized or partially gelatinized starch may also be used.

The SCM is prepared for the encapsulation reaction by conversion to an alkoxide with an alkali metal hydroxide. Sodium and potassium hydroxide are the most suitable reagents for this purpose and will react with the SCM in aqueous suspension at ambient temperature. The alkoxidation will simultaneously effect gelatinization provided that the alkali metal is provided at a level of at least about 1 mole per 2.5 moles of anhydroglucose units (AGU). As the molar ratio of alkali metal: AGU approaches 1:1, the extent of the subsequent encasement is significantly reduced. The preferred range is between 1:2.5 and 1:2. The gelatinization and alkoxidation solubilize the starch to the degree possible for a polymer, thereby producing a paste in the presence of water.

The concentration of SCM in the aqueous suspension prior to pasting should be maintained within the range of 6–20% solids. Below 6%, the active ingredient is not completely encapsulated. Above about 15%, the viscosity increases to a point of rendering the paste unworkable, though we have found that solids up to 20% can be employed if the paste is subjected to high shear, such as by treatment for a few seconds in a "Waring" blender. The preferred SCM concentration in regard to the extent of encasement and the general handling characteristics is in the range of 7-11% with 10% being about optimum.

The elastomeric materials contemplated for encasement within the scope of the invention are comprised of the emulsion elastomers including, but not limited to, natural rubber, styrene-butadiene (SBR) copolymer, acrylonitrile-butadiene (NBR) copolymer, polybutadiene, and polychloroprene. The material may be pure elastomer; it may contain trace additives such as emulsifiers, antigelling agents, antioxidants, and the like, in which case it will be defined herein as being substantially pure; or, may be a masterbatch formulation, thereby containing substantial quantities of normal rubber additives such as oil, carbon black, sulfur, reinforcing agents, pigmenting agents, vulcanizing agents, lubricants, antioxidants, plasticizers, resins, and the like as well known in the art. In accordance with the conventional emulsion elastomer processing, latexes of these materials are precipitated with alum, acid, or some other suitable agent. The resultant coagulate is washed to remove residual precipitant and then filtered or otherwise dewatered to remove the excess moisture. If acid was used as the precipitant, it is also desirable to neutralize the coagulate to a pH within the range of about 6-8 after washing. The wet and neutralized curds so obtained constitute the starting material of the instant method. These curds will typically have a solids content in the range of about 25-75%, and preferably about 50%.

The curds are suspended in the SCM alkoxide paste in a proportion such that the ratio of SCM: elastomer material is at least 1:23 on a dry weight basis. We have found that ratios as high as 1:1 can be employed. Though it is understood that at the higher levels of starch, the elasticity of articles prepared from the particulate composition is substantially reduced.

Insolubilization of the paste with concomitant encasement of the encapsulating agent is effected by the addition of a source of bivalent cations selected from the group of calcium, barium, and strontium. The source must be readily ionizable in water and thereby able to react with the SCM alkoxide from a single phase. Cationic displacement of the alkali metal ions on the alkoxide produces an insoluble adduct. By predissolving the cation source in an aqueous medium and rapidly mixing it with the paste dispersion, insolubilization is substantially instantaneous. The result is the formation of an adduct coating around each particle of coagulated latex.

The preferred sources for the bivalent cations are the chloride salts of the respective metals. Because of its high solubility, nontoxicity, and low cost, calcium chloride is the preferred insolubilizing agent. The molar ratio of bivalent cation: alkali metal should be greater than 1:2.5 in order to prevent the product from becoming gummy and difficult to isolate. Generally the ratio of these two entities will be between 1:2 and 1:0.5.

The product is recovered by removal of excess water by any common procedure known in the art. Preferably the solid is first drained, and then the bulk of the remaining free water can be pressed out. Finally, air drying or some other form of low temperature dehydration will yield a free-flowing powder or crumb, which does not congeal or agglomerate on storage.

This product may be readily compounded with any of the usual rubber additives, supra, by means of conventional mixing equipment. For example, V or ribbon blenders are useful for powdered ingredients, and high-speed rotary blade mixers of the "Waring" or "Henshel" type are preferred for crumb-sized encased elastomer and for flaked or pelletized additives.

Upon roll milling, the premixed particulate compositions are converted into solidified masses of elastomer with uniformly dispersed additives. The entire process is completed in a fraction of the time required by the prior art practice in which the elastomer is first banded on the roll, followed by individual incorporation of each ingredient. The particulate elastomer compositions of this invention may also be shaped into compression mold blanks or into fully fabricated articles by direct extrusion or injection molding. Cure time for the instant compositions is roughly comparable to that of conventional slab rubber, and the properties of the vulcanized material are generally superior or comparable as noted below in the examples.

The following examples are intended only to further illustrate the invention and are not intended to limit the scope of the invention which is defined by the claims.

EXAMPLE 1

Four hundred sixty-three grams of SBR 1712 latex containing 100 g. of SBR rubber was combined, by stirring, with 48 g. of a naphthenic-type oil and 80 g. of a N-326-type carbon black which had been slurried in 500 ml. water with a blender. With rapid stirring, 1 molar $H_2SO_4$ was added to the mixture until the pH was reduced to a value of 4, thereby yielding small tacky particles of coagulum. After two water rinses, the sample was slurried and neutralized with 40 ml. of 8% NaOH in water, and then drained.

Nine grams of unmodified pearl corn starch was slurried in 60 ml. of $H_2O$ and then gelatinized with 1.1 g. NaOH in approximately 20 ml. water, thereby providing a NaOH: starch AGU molar ratio of 1:2. The resultant paste having a starch concentration of 10.0% was hand mixed with the coagulum. Thereafter, 2.5 g. $CaCl_2$ as a mixture of the di- and trihydrate in 80 ml. water was rapidly added, with mixing to insolubilize the starch. The amount of $CaCl_2$ added provided a $Ca^{++}$: $Na^+$ molar ratio of approximately 1:1.7. After draining, the precipitate was press dried with a rubber dam on a Buchner funnel. The filter cake was broken up in a blender for less than 15 seconds and air dried at room temperature on a tray. The procedure yielded 229 g. of nontacky, free-flowing particulate elastomer, 6.4% of which passed through a 10-mesh screen having openings of 2.0 mm.

EXAMPLE 2

The procedure of Example 1 was repeated except 37.5 g. of an aromatic-type oil was substituted for the 48 g. of naphthenic oil, and encasement was effected by mixing with the coagulum a paste prepared from 18 g. starch slurried in 120 ml. water and then gelatinized with 2.2 g. NaOH in 37 ml. water and thereafter insolubilizing the paste with 7 g. of the hydrated $CaCl_2$. The molar ratio of NaOH: starch AG U was 1:2, the starch concentration of the paste was 10.0%, and the $Ca^{++}$: $Na^+$ molar ratio was approximately 1:1.2. The product was a nontacky, free-flowing particulate elastomer, 70.0% of which passed a 10-mesh screen.

EXAMPLE 3

The procedure of Example 1 was repeated except that the oil was omitted and 3.5 g. of the hydrated CaCl$_2$ was used to insolubilize the starch. This amount of CaCl$_2$ provided a Ca$^{++}$: Na$^+$ molar ratio of 1:1.2. The product was a nontacky, free-flowing particulate elastomer, 48.1% of which passed a 10-mesh screen.

EXAMPLE 4

The procedure of Example 1 was repeated except that the 463 g. of SBR 1712 latex was diluted with water to 3 liters, the amount of carbon black was reduced to 70 g., and the amount of hydrated CaCl$_2$ was increased to 4 g. This level of CaCl$_2$ provided a Ca$^{++}$: Na$^+$ molar ratio of 1:1.1. Dilution of the latex has the effect of reducing the particle size of the coagulum. The product was a nontacky, free-flowing particulate elastomer, 49.3% of which passed a 10-mesh screen.

EXAMPLE 5

The products of Examples 1–4 were formulated and compared to a control formulation as follows:

| Control formulation: | grams |
|---|---|
| SBR 1712 solid rubber | 100 |
| N-326 carbon black | 80 |
| naphthenic oil | 48 |
| Ingredient Group A: | |
| ZnO | 4.5 |
| stearic acid | 1.5 |
| sulfur | 2.63 |
| N-t-butyl-2-benzothiazyl sulfonamide antioxidant | 1.5 |
| Formulation 1: | |
| Product from Example 1 | 240 |
| Ingredient Group A | |
| Formulation 2: | |
| Product from Example 2 | 240 |
| Ingredient Group A | |
| Formulation 3: | |
| Product from Example 3 | 190 |
| Naphthenic oil | 48 |
| Ingredient Group A | |
| Formulation 4: | |
| Product from Example 4 | 230 |
| Ingredient Group A | |

The ingredients for each preparation were combined on a two-roll rubber mill in accord with the ASTM Part 28, D15 standard procedures, except the particulate elastomers of Formulations 1–4 were premixed with Ingredient Group A by shaking them in a plastic bag, thereby shortening the milling operation to approximately 15 minutes. Since the elastomer of the control formulation was initially in slab form, the additives of Ingredient Group A were individually combined therewith in accordance with the standard procedure, thereby requiring a milling time of approximately 28 minutes. The properties of the roll mill-mixed formulations are given below in the Table.

It is understood that the foregoing detailed description is given merely by way of illustration and that modification and variations may be made therein without departing from the spirit and scope of the invention.

TABLE

| | | Physical properties of the cured[b] formulations | | | | |
|---|---|---|---|---|---|---|
| Formulation | Cure time[a] (min.) | Tensile strength at break (p.s.i.) | Elongation at break (%) | Relative integrated work to break | Tensile strength at 300% elongation (p.s.i.) | Permanent set, 10 min. after break (%) |
| Control | 22.5 | 1380 | 300 | 1535 | 1380 | <5 |
| 1 | 29 | 1140 | 320 | 1743 | 1020 | 10 |
| 2 | 18.5 | 1840 | 400 | 1966 | 1200 | 16 |
| 3 | 26.2 | 1840 | 450 | 2305 | 980 | 18 |
| 4 | 28 | 760 | 400 | 2000 | 620 | 10 |

[a] 90% optimum cure time by Monsanto Rheometer at 302° F.
[b] 90% of optimum cure.

We claim:

1. A method of preparing a free-flowing, nonagglomerating, particulate elastomer composition from wet, coagulated particles of an emulsion elastomer material, wherein said particles have a pH in the range of about 6-8, said method comprising:
   a. preparing a dispersion of said particles in a film-forming material comprising an aqueous paste of a starch-containing material (SCM) alkoxide, wherein said paste has a solids concentration of SCM alkoxide of from about 6–20% and wherein the relative amount of said SCM alkoxide with respect to said elastomer material is in the range of about 4% to about 100%, on a dry weight basis;
   b. reacting said SCM alkoxide with a suitable bivalent cation selected from the group consisting of calcium, barium, and strontium to form an insolubilized coating around said particles;
   c. removing excess water from said coated elastomer particles; and
   d. recovering said free-flowing particulate elastomer composition.

2. A method as described in claim 1 wherein said emulsion elastomer material is a substantially pure elastomer.

3. A method as described in claim 1 wherein said emulsion elastomer material is a masterbatch formulation.

4. A method as described in claim 1 wherein said emulsion elastomer material comprises an elastomer selected from the group consisting of natural rubber, styrene-butadiene copolymer, acrylonitrile-butadiene copolymer, polybutadiene, and polychloroprene.

5. A method as described in claim 1 wherein said SCM alkoxide is the sodium or potassium salt of cereal starch, potato starch, cereal flour, or potato flour.

6. A method as described in claim 1 wherein said bivalent cation is calcium.

7. A composition of matter produced by the process of claim 1.

8. A composition of matter produced by the process of claim 4.

9. A composition of matter produced by the process of claim 5.

10. A composition of matter produced by the process of claim 6.

* * * * *